(12) United States Patent
Johnson et al.

(10) Patent No.: US 10,112,213 B2
(45) Date of Patent: Oct. 30, 2018

(54) SYSTEM AND METHOD FOR COATING A SUBSTRATE

(71) Applicant: PALO ALTO RESEARCH CENTER INCORPORATED, Palo Alto, CA (US)

(72) Inventors: David Mathew Johnson, San Francisco, CA (US); Victor Alfred Beck, Livermore, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 15/981,710

(22) Filed: May 16, 2018

(65) Prior Publication Data

US 2018/0257103 A1 Sep. 13, 2018

Related U.S. Application Data

(62) Division of application No. 14/997,915, filed on Jan. 18, 2016, now Pat. No. 9,993,839.

(51) Int. Cl.
*B05D 1/02* (2006.01)
*B01J 2/02* (2006.01)
(Continued)

(52) U.S. Cl.
CPC .................. *B05D 1/02* (2013.01); *B01J 2/02* (2013.01); *B05B 5/1683* (2013.01); *B05B 7/18* (2013.01);
(Continued)

(58) Field of Classification Search
None
See application file for complete search history.

(56) References Cited

U.S. PATENT DOCUMENTS 2,551,582 A 5/1951 Carlson
3,052,213 A 9/1962 Schaffert
(Continued)

FOREIGN PATENT DOCUMENTS

EP 2227834 8/2011
WO 93/13897 7/1993
(Continued)

OTHER PUBLICATIONS

Sholin, V. et al: "High Work Function Materials for Source/Drain Contacts in Printed Polymer Thin Transistors," Applied Physics Letters, vol. 92, 2008.
(Continued)

*Primary Examiner* — Nathan T Leong
(74) *Attorney, Agent, or Firm* — Miller Nash Graham & Dunn LLP

(57) ABSTRACT

A method of powder coating a substrate includes receiving a powder coating material into a feed input, using the feed input, melting the powder coating material into a homogeneous fluid of powder coating material, receiving the homogeneous fluid of powder coating material into a filament extension atomizer positioned in-line with the feed input, atomizing, with the filament extension atomizer, the received homogeneous fluid of powder coating material into multiple droplets of powder coating material, cooling the droplets of powder coating material to a processing temperature that prevents the droplets from agglomerating, and directing the cooled droplets through a deposition passage positioned in-line with the filament extension atomizer, the deposition passage configured to direct at least a portion of the cooled droplets towards a substrate.

10 Claims, 2 Drawing Sheets

(51) Int. Cl.
*B05B 5/16* (2006.01)
*B05B 9/00* (2006.01)
*B05B 7/18* (2006.01)
*B05B 5/08* (2006.01)
*B05D 1/06* (2006.01)

(52) U.S. Cl.
CPC .............. *B05B 9/00* (2013.01); *B05B 5/081* (2013.01); *B05D 1/06* (2013.01); *B05D 2202/00* (2013.01); *B05D 2252/04* (2013.01); *B05D 2401/00* (2013.01); *B05D 2401/32* (2013.01)

(56) References Cited

U.S. PATENT DOCUMENTS

| | | |
|---|---|---|
| 3,068,115 A | 12/1962 | Gundlach |
| 3,330,683 A | 7/1967 | Simm et al. |
| 3,554,815 A | 1/1971 | Otto |
| 3,649,829 A | 3/1972 | Randolph |
| 3,702,258 A | 11/1972 | Gibbons et al. |
| 3,779,166 A | 12/1973 | Pressman et al. |
| 3,977,323 A | 8/1976 | Pressman et al. |
| 4,222,059 A | 9/1980 | Crean et al. |
| 4,384,296 A | 5/1983 | Torpey |
| 5,103,763 A * | 4/1992 | Goldowsky ....... G02F 1/133516 118/624 |
| 5,204,697 A | 4/1993 | Schmidlin |
| 5,270,086 A | 12/1993 | Hamlin |
| 5,609,919 A | 3/1997 | Yuan et al. |
| 6,576,861 B2 * | 6/2003 | Sampath ................. C23C 24/04 219/121.47 |
| 6,934,142 B2 | 8/2005 | Grosse et al. |
| 7,083,830 B2 | 8/2006 | Minko |
| 8,132,744 B2 | 3/2012 | King et al. |
| 8,272,579 B2 | 9/2012 | King et al. |
| 8,552,299 B2 | 10/2013 | Rogers et al. |
| 8,742,246 B2 | 6/2014 | Toyoda et al. |
| 2004/0050701 A1 | 3/2004 | McEntee et al. |
| 2005/0000231 A1 | 1/2005 | Lee |
| 2005/0202270 A1 * | 9/2005 | Skoog ..................... C23C 24/08 428/632 |
| 2009/0014046 A1 | 1/2009 | Yu et al. |
| 2010/0154856 A1 | 6/2010 | Yuichi et al. |
| 2011/0017431 A1 | 1/2011 | Yang et al. |
| 2011/0150036 A1 | 6/2011 | Lee et al. |
| 2011/0154558 A1 | 6/2011 | Peter et al. |
| 2012/0227778 A1 | 9/2012 | Leonov |
| 2013/0087180 A1 | 4/2013 | Stark et al. |
| 2014/0146116 A1 | 5/2014 | Paschkewitz |
| 2015/0190824 A1 | 7/2015 | Nardi et al. |
| 2015/0197063 A1 | 7/2015 | Shinar et al. |
| 2016/0326386 A1 | 11/2016 | Toyserkani et al. |
| 2017/0203326 A1 | 7/2017 | Johnson et al. |

FOREIGN PATENT DOCUMENTS

| | | |
|---|---|---|
| WO | 97/09125 | 3/1997 |
| WO | 2004028707 | 4/2004 |
| WO | 2006122645 | 11/2006 |

OTHER PUBLICATIONS

Zhou, Li, et al: "Highly Conductive, Flexible, Polyurethane-Based Adhesives for Flexible and Printed Electronics," Advanced Functional Materials, vol. 23, p. 1459-1465, wileyonlinelibrary.com.
McClure, Max, "Stanford Researchers' Cooling Glove Better than Steroids—and Helps Solve Physiological Mystery Too", Stanford Report, Aug. 29, 2012, 3 pages, retrieved from the Internet: http://news.stanford.edu/news/2012/august/cooling-glove-research-082912.html, retrieved on Dec. 19, 2014.
Matheson, Rob, "Cool Invention Wins First Place at MADMEC", MIT News Office, Oct. 17, 2013, 3 pages, retrieved from the Internet: http://newsoffice.mit.edu/2013/madmec-design-competition-1017, retrieved on Dec. 19, 2014.
Vanhemert, Kyle, "MIT Wristband Could Make AC Obsolete", Wired.com, Oct. 30, 2013, retrieved from the Internet: http://www.wired.com/2013/10/an-ingenious-wristband-that-keeps-your-body-at-theperfect-temperature-no-ac-required/, retrieved on Dec. 19, 2014.
Francioso, L., "Flexible thermoelectric generator for ambient assisted living wearable biometric sensors", Journal of Power Sources, vol. 196, Issue 6, Mar. 15, 2011, pp. 3239-3243.
http://www.stacoolvest.com/, retrieved on Dec. 19, 2014.
http://www.steelevest.com/, retrieved on Dec. 19, 2014.
http://www.veskimo.com/, retrieved on Dec. 19, 2014.
http://www.glaciertek.com/, retrieved on Dec. 19, 2014.
http://www.cvs.com/shop/product-detail/CVS-Cold-Pain-Relief-Pack-Reusable?skuId=324111, retrieved on Dec. 19, 2014.
Chen, A.,"Dispenser-printed planar thick-film thermoelectric energy generators," J. Micromech. Microeng., 21(10), 2011.
Hewitt, A.B., "Multilayered Carbon Nanotube/Polymer Composite Based Thermoelectric Fabrics," Nano Letters, 12 (3), pp. 1307-1310, 2012.
Arens, E., "Partial- and whole-body thermal sensation and comfort—Part I: Uniform environmental conditions," Journal of Thermal Biology, vol. 31, Issues 1-2, Jan. 2006, pp. 53-59.
Arens, E., "Partial- and whole-body thermal sensation and comfort—Part II: Non-uniform environmental conditions," Journal of Thermal Biology, vol. 31, Issues 1-2, Jan. 2006, pp. 60-66.
Bullis, Kevin, "Expandable Silicon", MIT Technology Review, Dec. 14, 2007, URL: http://www.technologyreview.com/news/409198/expandable-silicon/, retrieved from the Internet on Dec. 23, 2014.
"Ortho-Planar Spring", BYI Mechanical Engineering Website, URL: http://compliantmechanisms.byu.edu/content/ortho-planar-spring, retrieved from the Internet on Dec. 23, 2014.
S.-J. Kim, J.-H. Wea and B.-J. Cho: "A wearable thermoelectric generator fabricated on a glass fabric," Energy Environmental Science, 2014.
L. Francioso, C. De Pascali, A. Taurino, P. Siciliano, A. De Risi: "Wearable and flexible thermoelectric generator with enhanced package," In Proc. SPIE 8763, Smart Sensors, Actuators, and MEMS VI, 876306, May 2013.
C. Huizenga, H. Zhang, E. Arens, D. Wang: "Skin and core temperature response to partial-and whole-body heating and cooling," Journal of Thermal Biology, vol. 29, Issues 7-8, Oct.-Dec. 2004, pp. 549-558.
Bhat, Pradeep P., "Formation of beads-on-a-string structures during break-up of viscoelastic filaments," Aug. 2010, vol. 6:625-631, Nature Physics, 7 pages.
Le, Hue P., "Progress and Trends in Ink-jet Printing Technology," Jan./Feb. 1998, vol. 42:49-62, Journal of Imaging Science and Technology, 16 pages, found at: http://www.imaging.org/ist/resources/tutorials/inkjet.cfm.
Oliveira, Monica S., "Iterated Stretching, Extensional Rheology and Formation of Beads-on-a-String Structures in Polymer Solutions," Jan. 20, 2006, Special Issue of JNNFM on Extensional Flow, MIT, Cambridge, MA, 36 pages.
Owen, M., "Misting of non-Newtonian Liquids in Forward Roll Coating," Jul. 13, 2011, Journal of Non-Newtonian Fluid Mechanics, vol. 166:1123-1128, 6 pages.
Shi, X.D., "A Cascade of Structure in a Drop Falling from a Faucet," Jul. 8, 2004, vol. 265:219-222, Science, 4 pages.
Chapter 15, "Ink Jet Printing", 14 pages, found at http://www.lintech.org/comp-per/15INK.pdf.
Marple, A. and Liu, Y.H.: "Characteristics of Laminar Jet Impactors", Environmental Science & Technology, vol. 8, No. 7, Jul. 1974, pp. 648-654.
Bailey, Adrian G.: "The Science and technology of electrostatic powder spraying, transport and coating", Journal of Electrostatics, vol. 45, 1998, pp. 85-120.
Domnick, et al.: "The Simulation of Electrostatic Spray Painting Process with High-Speed Rotary Bell Atomizers. Part II: External Charging", Part. Part. Syst. Charact. vol. 23, 2006, pp. 408-416, URL: http://www.ppsc-journal.com.

(56) References Cited

OTHER PUBLICATIONS

Kelly, Ryan T, et al.: "The ion funnel: theory, implementations, and applications", Mass Spectrometry Reviews, vol. 29, 2010, pp. 294-312.
Crowe, Clayton et al.: "Multiphase Flows With Droplets and Particles", CRC Press, LLC, 1998.
Extended European Search Report, EP17151186.8, Jun. 14, 2017.
Extended European Search Report, EP17151227.0, Jun. 27, 2017.
Extended European Search Report, EP17151223.9, Jun. 12, 2017.
N.N.: "Filament Extension Atomizer, Next Generation Spray Technology for Difficult Spray Materials," Sep. 8, 2016, found at https://www.parc.com/content/attachments/FEA-Spray_fact_sheet_20160808.pdf.
Bingheng et al., "Development Trends in Additive Manufacturing and 3D Printing," Engineering 2015, 2015(1)(1); 85-89.

\* cited by examiner

```
                    ┌─────────────────────┐
                    │ LOAD COATING MATERIAL│
                    └──────────┬──────────┘
                               ▼
                    ┌─────────────────────┐
                    │ PREPARE COATING     │
                    │ MATERIAL FOR        │
                    │ FILAMENT EXTENSION  │
                    │ APPARATUS           │
                    └──────────┬──────────┘
                               ▼
                    ┌─────────────────────┐
                    │ PREPARE COATING     │
                    │ MATERIAL FOR        │
                    │ FILAMENT EXTENSION  │
                    │ APPARATUS           │
                    └──────────┬──────────┘
```

```
┌───────────────────────┐          ┌─────────────────────┐
│ PREPARE SUBSTRATE FOR │          │ AEROSOLIZE COATING  │
│        COATING        │          │ MATERIAL BY FILAMENT│
└───────────┬───────────┘          │ EXTENSION APPARATUS │
            ▼                      └──────────┬──────────┘
┌───────────────────────┐                     ▼
│ COAT SUBSTRATE WITH   │          ┌─────────────────────┐
│ FILAMENT EXTENSION    │          │ PREPARE AEROSOLIZED │
│ APPARATUS GENERATED   │          │ MATERIAL FOR COATING│
│ AEROSOLIZED COATING   │          └──────────┬──────────┘
└───────────┬───────────┘                     ▼
            ▼                      ┌─────────────────────┐
┌───────────────────────┐          │ DEPOSIT COATING     │
│   CURE COATING TO     │          │ MATERIAL ONTO       │
│      SUBSTRATE        │          │ SUBSTRATE           │
└───────────────────────┘          └──────────┬──────────┘
                                              ▼
                                   ┌─────────────────────┐
                                   │ CURE COATING        │
                                   │ MATERIAL TO         │
                                   │ SUBSTRATE           │
                                   └─────────────────────┘
```

SYSTEM AND METHOD FOR COATING A SUBSTRATE

CROSS REFERENCE TO RELATED APPLICATION

This is a divisional of U.S. patent application Ser. No. 14/997,915 filed Jan. 18, 2016, which is incorporated herein by reference in its entirety.

BACKGROUND

Powder coating is an important industrial process that allows for the coating of various materials with a surface film of varying compositions. Metallic pieces or objects often undergo a powder coating process in place of paint, with the deposited coating having various desirable properties, such as color and durability. Typically the coating consists of a plastic, often a thermoplastic, base material that is applied to the substrate as a powder then cured to form a uniform and cohesive coating or film across the substrate.

The powderized coating material is electrostatically charged and sprayed towards a grounded substrate. The electrostatic potential between the powder and substrate attracts the powder to the substrate surface. Additionally, the use of the electrostatic potential between the two elements ensures that an even and complete coating is achieved across the entire surface of the substrate. Once coated, the substrate is cured to achieve the final coating. The curing process often involves heating the deposited powder until it liquefies to form the film, or coating, across the substrate surface. The cured substrate and coating is then cooled, completing the coating process.

Powder coating has many benefits as a coating process. Besides the even coat, any residual or overspray of the powder can be collected and reused in future powder coating processes. This means the powder coating process is very efficient as only the necessary amount of powderized coating material is used per piece of coated substrate. However, the desired coating material must first be powderized before the powder coating process can occur. Typically this involves melting a base material and adding any colorants or other desired additives, to form a liquid form of the coating material. The liquid coating material is then cooled into sheets of solid coating material that is then broken up or pulverized to form the coating powder. Once deposited on a substrate and cured, the powdered coating material re-melts to form a liquid that covers the surface of the substrate in a film of the coating material.

As such, the process of forming the powderized coating and depositing and curing the powderized coating occur as two distinct processes and in two distinct physical locations. Often this means a supplier formulates and produces the powder and a user applies and cures the powder to a desired substrate.

Forming the powderized coating often requires melting and blending the coating materials which are then cooled and processed into a powder. Once deposited the powder is heated to melt it into the final coating. This means in the conventional methods, the coating material goes through at least two complete heating and cooling cycles to form the final coat on a substrate.

The powder coating art would greatly benefit from a system and method that is more efficient and requires less energy than the conventional methods.

SUMMARY

An embodiment disclosed here involves a method of powder coating a substrate that includes receiving a powder coating material into a feed input, using the feed input, melting the powder coating material into a homogeneous fluid of powder coating material, receiving the homogeneous fluid of powder coating material into a filament extension atomizer positioned in-line with the feed input, atomizing, with the filament extension atomizer, the received homogeneous fluid of powder coating material into multiple droplets of powder coating material, cooling the droplets of powder coating material to a processing temperature that prevents the droplets from agglomerating, and directing the cooled droplets through a deposition passage positioned in-line with the filament extension atomizer, the deposition passage configured to direct at least a portion of the cooled droplets towards a substrate.

BRIEF DESCRIPTION OF THE DRAWINGS

FIG. 2 is an example powder coating process according to an embodiment of the invention.

FIG. 3 is an example powder coating preparation and deposition process according to an embodiment of the invention.

DETAILED DESCRIPTION

Figure 1:
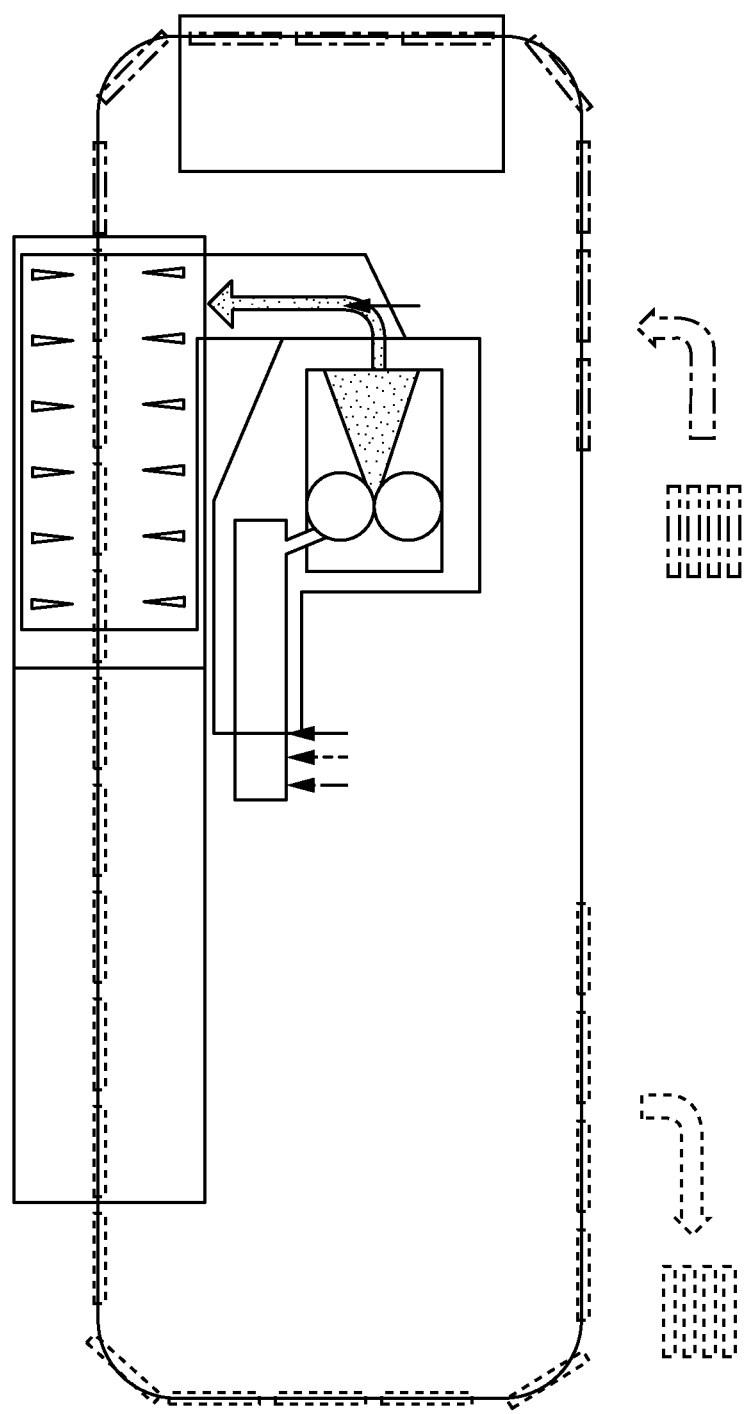
FIG. 1 is an example powder coating system according to an embodiment of the invention.

The disclosed new substrate coating systems and methods integrate the creation of the coating material and the deposition of the created coating material onto a substrate. The integrated nature increases the efficiency and flexibility of the overall system, allowing for rapid modifications of coating properties in an as-needed or on-demand basis as required or desired.

Powder coating materials are loaded into a coating processing portion of the system where the materials are prepared and aerosolized into a powder, or powder-like, form by a filament extension atomizer. The resulting powder is deposited uniformly onto the substrate material and cured. Curing the deposited powder results in the finished coating over the substrate surface.

An example powder coating system 100, according to an embodiment of the invention, is shown in FIG. 1. The powder coating system 100 prepares and deposits the coating material onto a substrate. The coated substrate that is then cured to complete the coating process. The coating material 132 is prepared for the coating process as part of the system 100. A feed input 130 is used to mix and prepare the powder coating material 132 for aerosolization, including melting the material into a fluid.

A filament extension atomizer 140 generates an aerosol, or droplets, of the fluid powder coating material by stretching the fluid material between two rotating rollers 142. The rollers 142 stretch the fluid powder material between the two diverging surfaces of the rollers 142 as the rollers rotate away from each other. The fluid powder coating material pools on an upstream side of a nip, the space between the pair of rollers 142, and is drawn into the nip as the rollers counter-rotate. On a downstream side, the fluid powder coating material is stretched into a filament between diverging surfaces of the rollers, to which a portion of the fluid still adheres. As the filament is stretched, the filament grows longer and thinner. When the filament reaches a point of instability, the capillary break-up point of the filament, the filament breaks into several drops. As the rollers counter-rotate, continuous formation and break-up of filaments across the surface of the rollers 142 generates the aerosol of powder coating material droplets. The aerosol of powder coating material is then directed to further portions of the process for deposition onto the substrate. Alternative forms of a filament extension atomizer 140 can be used, other apparatuses utilize alternate means of creating diverging surfaces, including co-rotating rollers, a single roller and a belt or other linear surface, a system of one or two pistons which stretch a filament between a piston and another piston or other surface and other alternative apparatuses capable of stretching a fluid filament between one or more diverging surface.

As the fluid powder coating material is stretched into filaments, the filaments reach a capillary break up point, and break down into a number of droplets, forming the aerosol 144 of powder coating material. The aerosol 144 is directed towards the coating chamber 122 by a cooling element, an air stream 152. The air stream 152 cools the aerosol, preparing the formed aerosol droplets for deposition onto the substrate and preventing agglomeration of the droplets. In the example shown, the air stream 152 cools an outer surface of the droplets, reducing the "sticky" nature of the outer surface, making at least the outer surface cool, or solid, enough to prevent agglomeration of the droplets during the deposition process. Preparing the droplets to prevent agglomeration is important otherwise the droplets could adhere to each other or to the substrate being coated without the aid of an electrostatic force. Establishing and utilizing an electrostatic potential between the droplets and the substrate allows the substrate to achieve and even and desired coating of the powder coating material. The air stream 152 further directs the droplets through the deposition passage 150. As the aerosol passes through the deposition passage 150, the droplets can be electrostatically charged. The charged droplets are attracted to the electrically grounded, or oppositely charged, prepared substrate 102 due to the electrostatic potential between the droplets of the aerosol and the substrate. The electrostatic potential between the charged aerosol and the substrate 102 attracts a thin layer of coating material to the substrate surface. As the electrostatically charged powder coating material is deposited onto the substrate, the magnitude of the electrostatic potential between the two materials is reduced. The thickness of the coating can be varied and adjusted as desired by varying the magnitude of the electrostatic potential between the droplets and substrate. The greater the electrostatic potential, the more deposited powder coating material is required to reduce electrostatic potential.

The powder coated substrate 103 is then placed in a curing section 126 that cures the substrate and deposited coating material. Curing the substrate and deposited coating material can include a thermal curing process, a photo-curing process, a chemical curing process, other curing processes and combinations thereof. Curing can cause the deposited coating material to polymerize and cross-link into the final coating. In the example shown, the substrate and deposited coating material are heated, causing the powdered coating material to melt across the surface of the substrate 103, coating the surface of the substrate with the coating material. The cured, coated substrate 104 is then cooled, which can complete the coating process. After the coated substrates 105 are cooled, they are removed from the system 100.

The system 100 integrates the two distinct parts of the overall powder coating process, generation, or creation, of the powderized coating material and the application of the powderized coating onto a substrate 101. In typical systems, the powder is formed by a supplier and then applied by a user. The system 101 integrates both portions of the process, increasing the overall efficiency of the powder coating process and allowing for quick changes in the coating material and deposition to maintain the quality or other physical properties of the final coating.

The substrate 101 can be any number of materials suitable for a powder coating process, such as metals and others. In the example system 100, as shown in FIG. 1, the substrate 101 is placed on a transport system that assists in moving the substrate material through the various sections of the system 100. The transport system can be a rail system on which the substrate 101 can be mounted onto a bracket or holder and moved through the various system 100 sections. The transport system can be automated or the attached substrate 101 can be moved manually along the transport system rails.

Once loaded onto the example transport system, the substrate 101 enters a substrate preparation area 110, in which the substrate surface is prepared for the powder coating process. In alternative embodiments, the substrate 101 can be moved manually through the whole system, or placed by a user, a machine or others in the various sections. The substrate surface is cleaned of contaminants and debris that can affect the coating process and the final quality of the coating. Chemical and/or mechanical cleaning methods can be used to clean and prepare the substrate surface, including chemical bathes and rinses and/or sandblasting or the like. The prepared substrate 102 is then ready to undergo the powder coating process and is transferred to the coating and cure section 120.

The aerosolized powder coating material used in the coating process is created within the system 100, in an as-needed basis. That is, the system 100 includes not only the ability to deposit the coating materials onto the substrate, but also the creation of the powdered coating materials. The powdered coating materials are produced within the system 100 and are formulated to have the desired properties, such as color and coating composition. The timely nature of the powder coating material creation allows the whole system 100 to adapt quickly, changing coating formulation and offering the ability to customize the coating formulations. The changing and customization of the coating formulation is done within the system 100 rather than having to rely on a powder producer and/or wait for powdered coating material of a desired formulation.

Powder coating material 132 is fed into a feed input 130 that mixes and prepares the bulk material(s) for aerosolization by the filament extension atomizer 140. The powder coating materials 132 can consist of the coating material and any additional colorants, stabilizers, or additives, as necessary or desired. The coating material can include a thermoplastic or thermoset material. The additives can be included in the formulation of the coating material to alter physical or aesthetic parameters of the final coating. In some example formulations, the additives can be included to strengthen the final coating, making the coating more durable. Colorants can be included in the coating formulation to create a final coating having a desired color or color profile. Stabilizers can be included to assist with the mixing of the various coating formulation components and assist with the aerosol formation, deposition and curing process of the coating. The powder coating material 132 can be introduced into the feed input 130 as pellets or other forms. In some examples, a mix of forms can be used for the powder coating materials, such as pellets of the coating material and a colorant in the form of a powder.

If a user desires to change the formulation of the coating material, the feed input 130 can be cleared by simply purging and cleaning, if necessary. The powder coating material is heated within the feed input 130 to form a liquid that can be formed into the aerosolized coating material using a filament extension atomizer. Since the coating material is a liquid, or can be heated to melt into a liquid state, within the feed input 130, clearing the feed input is a relatively simple process of purging residual or undesired coating material. This material can be cooled to re-set the material in a solid form that can then be reprocessed through the feed input 130 to form future coating material. Once the feed input 130 is cleared, new powder coating material to create a different, desired formulation of coating material can be processed through the apparatus 130.

Alternatively, additives or other additional powder coating materials can be added to the already created coating formulation to alter the formulation to a desired one.

In an example, a twin screw extruder is employed as the feed input 130. The twin screw extruder 130 uses a pair counter-rotating helical screws that are aligned angularly to each other such that the ends of the pair of screws terminate towards a point. The helical pattern of the screws drives inserted materials down the length of the screws. As the separation between the two screws narrows, due to the angular arrangement, the inserted materials are mechanically processed, heating and mixing the inserted material between the pair of helical screws. Various screw designs can be implemented depending on the material that perform a combination of mechanical and thermal processing such as heating, cooling, compressing, shearing, or shaping. Powder coating materials 132, the materials that will comprise the deposited coating, are fed into the twin screw extruder 130 which heats, mixes and fluidizes the bulk coating materials in preparation for aerosolization by the filament extension atomizer 140. The twin screw heats and melts the bulk materials into a homogeneous liquid, or semi-liquid, extrusion that is fed into the filament extension atomizer 140. Alternative forms of a feed input 130 can be used, such as a heated mixing apparatus, or other apparatus capable of melting and homogenizing the powder coating materials 132. The feed input 130 is capable of preparing the powder coating materials 132 for use with a filament extension atomizer 140.

The fluid powder coating material is introduced into a filament extension atomizer 140. In this example, the filament extension atomizer includes counter-rotating rollers 142. As one or both of the rollers 142 rotates, a thin layer of fluid powder coating material is deposited across its surface. At a nip, the point at which the rollers 142 are closest, the counter-rotating roller engages the layer of fluid powder coating material. As the rollers 142 counter-rotate, the engaged fluid powder coating material is stretched, on a downstream side, between the diverging surfaces of the rollers 142. The engaged fluid powder coating material is stretched until it forms filament(s) of fluid powder coating material between the diverging surfaces of the two rollers. As the rollers 142 continue to rotate the filament is stretched to a point of instability, a capillary break-up point, causing the filament to breakdown into a plurality of droplets. The repeated formation and breakdown of the filaments across the rollers 142 forms an aerosol of coating material 144.

The filament extension atomizer can include additional features, such as heaters, fans, baffles or other mechanical elements that assist with the proper aerosolization of the fluid powder coating material. In an example embodiment, the interior of the filament extension atomizer can be heated, internally or externally, in order to maintain the fluidity of the powder coating material as it is aerosolized.

Many factors can affect the quality of the coating, such as environmental factors or other system factors. The integration of the feed input 130 and the filament extension atomizer 140 in-line with the powder coating system 100 increases the efficiency of the system 100. In the example system 100, the coating can be continuously modified to account for changes in the affecting factors, thus maintaining the desired quality of the coating. This can include the altering of the composition of the powder coating material to compensate for various environmental or other factors or to correct errors a user, a machine or others detect in the final coating. Further, the integrated nature allows for the rapid change of coating materials, stabilizers, colorants or other additives by simply adding the necessary components to alter the composition of the coating or creating and aerosolizing a new coating formulation. A complete change of powder coating material can be done by purging or flushing residual powder material from the feed input 130 and filament extension atomizer 140, and a new composition of powder coating materials can be introduced. The new formulation can be desired based on the substrate material and adherence of the coating, a color of the coating, strength of the coating, or other qualities of the powder coating as desired.

Once formed, the aerosol, droplets, of powder coating material 144 is directed from the filament extension atomizer and into a deposition passage 150. The deposition passage 150 connects the feed input 130 and the filament extension atomizer 140 to coating chamber 122 in a sequential, in-line arrangement. The aerosol can be directed due to the imparted kinetic energy created by the atomizer, an air current created by the rotation of the rollers or an introduced air stream 152 that directs the aerosol from the filament extension atomizer.

An airstream 152 is directed through the passage 150 to carry the aerosol towards the coating area 122. In addition to directing the aerosol 144 through the passage 150, the airstream 152 cools the formed droplets of coating material. The cooling of the droplets prepares the droplets for the powder coating process by solidifying at least some portion of the droplets. The preparation, in this example solidification, of the outer surface of the droplets prevents the droplets from adhering, or agglomerating, to one another during the deposition process. At minimum the droplets are cooled such that a solid surface is formed on the outside of the droplets, however they can also be cooled such that the entire droplet is solid. The now at least semi-solidified prepared droplets can be directed through the remainder of the passage 150 and processed further for the deposition stage.

A droplet sizing mechanism or filter can be placed within the passage 150 to permit droplets of a selected size and/or to exclude oversized droplets from the coating area 122. Alternatively, the air stream 152 can be used to sort the droplets based on size, such that the heavier droplets do not have the necessary momentum to flow through the passage because of their weight when directed by the airstream and instead fall out of the air stream 152 leaving the smaller droplets to continue through the passage.

The prepared substrate 102 is placed in the coating area 122 and electrically grounded, or charged, in preparation for the powder coating process. In the example embodiment, the transporter system can be grounded and electrically connected to the substrate, by a simple piece of copper wire or other means, thereby grounding the substrate. The aerosol of coating material 144 formed by the filament extension atomizer 140 is directed towards the substrate by various sprayers 124. As the coating material exits the sprayers 124, it is electrostatically charged. An electrostatic charging apparatus 124 can be used to charge the dispensed aerosolized coating material by directing the aerosol through a high voltage electrical field generated at the point of dispensing. Alternative dispensers can be used in the coating chamber 122 to dispense the generated aerosol of coating material in preparation for deposition onto the substrate surface. The electrostatically charged coating material is attracted and adheres to the grounded substrate 102 due to the charge difference, electrostatic potential, between the powder coating material and the grounded substrate. A number of sprayers 124 can be employed within the coating area 122 to ensure an even and equal coating of material across the substrate surface.

Any overspray or excess coating material can be collected and used as bulk coating material for later coating processes. The collected coating material can be fed directly back through feed input 130, reintroduced into the airstream 150, or collected and held for future coating processes.

The coated substrate 103 is then transported to a curing area 126 of the system 100. The curing area provides the necessary environment in which to cure the powder coating material to the substrate. Curing the powder coating material can include polymerizing and cross-linking the deposited coating material to form a cohesive layer. In the example shown, the curing area heats the coating material, a thermoplastic, to melt it, which causes the coating to bond to the substrate and form a cohesive layer. The heating can also be used to thermally cure a thermoset material. Alternatively, UV light can be used to cure the material, either alone or in combination with thermal energy.

In the example system 100 of FIG. 1, the coating material is deposited onto the substrate surface at a surface temperature below the melting point of the material, but above room temperature. The outer surfaces of the droplets are prepared for the powder coating process. Preparing the droplets can include cooling the droplets so that they are at least partially solid and may be fully solid. During the curing process, the amount of thermal energy required to melt the deposited coating materials into the finished coating is reduced since the materials already have a considerable amount of thermal energy above that of room temperature. The reduced thermal energy required per unit substrate during the curing process, or stage, increases the efficiency and economy of the system 100.

In a traditional powder production process, powder coating material is first heated or melted and blended to a desired formulation. The material is then cooled to a solid form and powderized. The material is usually powderized by a combination of milling, cutting, and grinding operations that often occur at a temperature below room temperature to increase the uniformity and quality of the powder. The powderized coating material is applied to a substrate and cured, or heated again, to melt the deposited materials into an even coating or film across the substrate surface. In the example systems outlined, the creation of the powderized coating material and deposition of the said material is contained in a single system.

The substrate and/or coating area 122 can be heated during the powder deposition process to help maintain the formed droplets of coating material at a specific temperature or within a specific temperature range. Additionally, preheating the substrate can decrease the time required to heat the coating after application and often can increase the quality and consistency of a coating.

In the system 100, the powder coating materials are heated, blended and aerosolized to form an aerosol of coating material. The aerosolized coating material is cooled sufficiently or in a manner to prevent agglomeration of the droplets. Cooling can include cooling the drops such that a solid, or nearly solid, shell exists about the outer surface of each of the droplets of aerosolized coating material. The solid surface character of the droplets prevents the droplets from agglomerating or sticking to other surfaces. The semi-cooled aerosol is deposited onto a substrate and cured. The curing in the system 100 can take less time and/or less energy than conventional methods that require heating the material from a cooled, solid state into a fluid state, since the deposited material of the system 100 is already at an elevated temperature. Reheating and melting the solid exterior surface of the deposited material is the required energy input for the curing process of the system 100.

Referring again to FIG. 1, the cured, coated substrate 104 emerges from the curing area 126 and is then cooled to a temperature that transforms the coating into a solid state, or at least solid enough that the quality of the coating is not compromised by handling. The temperature can be a range of temperatures and the degree of solidness of the coating can also be a range. Once the coated substrates reach a state in which they are solid enough to be handled, they can be removed from the system 100 as coated substrates 105.

The substrate coating process using the system 100 can be repeated as often as necessary to coat the desired unit of substrates. Additional coating material is created by adding more or having a continuous feed of powder coating materials into the feed input 130. Changing the formulation of the coating material can be easily and readily done in the manners discussed above since the creation of the powderized coating material is performed by the in-line, integrated feed input 130 and filament extension atomizer 140. As an example, the color of a coated substrate can be changed readily as material is moved through the system. With sufficient planning ahead, the color can be altered in a continuous or near continuous manner so that no purging of the powder production system, feed input 130, atomizer 140, or droplet handling system 150, is required.

In alternative embodiments, one or more pairs of feed input 130 and filament extension atomizer 140 can be integrated within the system 100. Each pair of devices 130 and 140 can aerosolize different formulations of coating material with the system 100 able to select which of the pair, and the coating formulation, is the active one dispensed into the coating area 122.

In a further alternative, the pair of devices 130 and 140 can be mounted in tandem and portable or exchangeable. In this manner a different pair of devices 130 and 140 can be exchanged with an existing pair of devices. The new pair can contain a different formulation of coating material or the same formulation of coating material if the current pair of devices 130 and 140 are down or offline for maintenance or other reasons.

FIG. 2 is a flowchart of an example powder coating process 200 according to an embodiment of the invention. Initially, the substrate is prepared 202 for a powder coating process 200 in any of the ways discussed above. The preparation can include cleaning the substrate and preparing the surface for the process 200, as discussed above, and can additionally or alternatively include chemically or physically treating the surface to assist the coating process and/or improve the quality of the final coating.

Once prepared, the substrate is coated 204 with an aerosolized coating of material formed by a filament extension atomizer. The filament extension atomizer, as discussed above, generates an aerosol of coating material. The generated aerosol is at least partially cooled to form a solid, or at least a solid shell about a fluid interior, of the generated droplets. The solid or semi-solid droplets are electrostatically charged and deposited across the surface of the substrate to uniformly coat it with the coating material.

The coated substrate can then be heated 206 to complete the coating process 200. The heating process 206 cures and/or melts, or fluidizes, the deposited coating material to form a film, or cohesive coating, across the surface of the substrate. Curing can also include thermal and/or UV energy that cross-links the deposited materials and creates the final coating.

FIG. 3 illustrates an example powder coating preparation and deposition process 300 according to an embodiment of the invention. Powder coating material is loaded 302 into a feed input, where the powder coating material is prepared 304 for the filament extension atomizer. Preparing the powder coating can include mixing and blending the various components of the coating material and melting or liquefying them to form a homogenous powder coating material in preparation for aerosolization. The powder coating material is required to be in at least a fluidized state for aerosolization by the filament extension atomizer.

The prepared fluidized, homogeneous powder coating material is transferred to a filament extension atomizer where the powder coating material is aerosolized 306 by counter-rotating rollers of the apparatus. The counter-rotating rollers of the filament extension atomizer stretch filaments of the powder coating material between downstream diverging surfaces of the two rollers. The filaments are stretched to a point where the filaments break, forming an aerosol of powder coating material droplets.

The formed droplets are then be prepared 308 for deposition across the substrate. Preparations can include cooling the droplets to solidify them, or at least solidify the outer surface of the droplets. While the outer surface is solidified, the interior material exists in a fluid-like state and having a viscosity. Due to the cooling of the outer surface, the fluid-like interior is also at least partially cooled, resulting in an interior having a high viscosity. As discussed above, maintaining a semi-solid nature of the aerosol droplets reduces the required thermal input that is required during the curing stage to increase the temperature and melt the deposited powderized coating material into a smooth, continuous coating. The powder coating material can also be cooled to a uniform temperature where the entire droplet is at a uniform temperature such that the powder is solid enough not to stick or agglomerate with other powder particles or surfaces. Additional preparation can include electrostatically charging the formed droplets, as described above.

The formed droplets of powder coating material are directed towards and deposited onto the substrate 310. The electrostatically charged coating material is attracted to the differently charged substrate and covers the substrate in an even and distributed manner.

Once the substrate has been coated in the aerosolized coating material, the substrate is cured 312 to complete the coating process. During the curing stage 312, the coating material is melted to form a continuous film, or coating, across the surface of the substrate.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A method of powder coating a substrate, comprising:
   receiving a powder coating material into a feed input;
   using the feed input, melting the powder coating material into a homogeneous fluid of powder coating material;
   receiving the homogeneous fluid of powder coating material into a filament extension atomizer positioned in-line with the feed input;
   atomizing, with the filament extension atomizer, the received homogeneous fluid of powder coating material into multiple droplets of powder coating material;
   cooling the droplets of powder coating material to a processing temperature that prevents the droplets from agglomerating; and
   directing the cooled droplets through a deposition passage positioned in-line with the filament extension atomizer, the deposition passage configured to direct at least a portion of the cooled droplets towards a substrate.

2. The method of powder coating a substrate of claim 1, further including preparing the substrate surface for deposition of cooled droplets of powder coating material.

3. The method of powder coating a substrate of claim 1, further including heating the substrate surface in preparation for deposition of the aerosolized coating material.

4. The method of powder coating a substrate of claim 1, wherein the feed input is further configured to receive at least one of a colorant, a stabilizer and an additive, and to mix the received at least one of the colorant, the stabilizer and the additive into the homogeneous fluid of powder coating material.

5. The method of powder coating a substrate of claim 1, wherein the feed input is a twin screw apparatus.

6. The method of powder coating a substrate of claim 1, further including excluding cooled droplets based on a physical parameter, including at least one of droplet size and weight.

7. The method of powder coating a substrate of claim 1, further including electrostatically charging the at least a portion of cooled droplets.

8. The method of powder coating a substrate of claim 7, further including causing the electrostatically charged at least a portion of cooled droplets to be directed onto the substrate due to an electrostatic potential between the electrostatically charged at least a portion of cooled of droplets and the substrate.

9. The method of powder coating a substrate of claim 1, further including maintaining an elevated temperature of the at least a portion of the cooled droplets before depositing the at least a portion of the cooled droplets onto the substrate.

10. The method of powder coating a substrate of claim 1, further including curing the at least a portion of cooled droplets onto the substrate to form a cohesive layer across the substrate.

* * * * *